Oct. 11, 1938.　　　　O. WITTEL ET AL　　　　2,132,714
LOCATING MEMBER FOR A FILM MAGAZINE WITH
RESPECT TO MOTION PICTURE APPARATUS
Filed June 11, 1935

INVENTORS:
Otto Wittel &
Lawrence R. Martin
BY
ATTORNEYS

Patented Oct. 11, 1938

2,132,714

UNITED STATES PATENT OFFICE 2,132,714

LOCATING MEMBER FOR A FILM MAGAZINE WITH RESPECT TO MOTION PICTURE APPARATUS

Otto Wittel and Lawrence R. Martin, Rochester, N. Y., assignors, by mesne assignments, to Eastman Kodak Company, Jersey City, N. J., a corporation of New Jersey Application June 11, 1935, Serial No. 26,020

4 Claims. (Cl. 88—17)

The present invention relates to members or means for locating a film magazine with respect to an associated motion picture apparatus, and more particularly to a locating means which is suitable for mounting a film magazine within a motion picture camera.

The outstanding advantage of motion picture apparatus of the magazine type is that the film, either undeveloped or processed, can be replaced very readily. Replacement of the film magazine, however, introduces a problem in that the aperture of the magazine must be accurately alined with the objective or aperture of the associated apparatus. Furthermore, considerable difficulty is encountered in locating the magazine so that the film therein is within the focal plane of the objective for good definition. Thus, the exposure position of film in the magazine must be accurate in three dimensions—the film must be properly located transversely and vertically of the apparatus for coaxial registration with the optical axis of the objective and also must be accurately positioned longitudinally of the apparatus so that the film will be within the focal plane of said objective.

The primary object of the present invention is the provision of locating means accurately to position a film magazine within an apparatus so that the film during exposure or projection is centered within the focal plane of the objective for the apparatus.

Another object of the invention is the provision of locating means which can be readily machined or adjusted to locate the magazine in its proper position. A further object of the invention is the provision of resilient means cooperating with the locating members to hold and maintain the magazine in engagement with said locating members. Other and further objects of the invention will be suggested to those skilled in the art by the following description.

The above and other objects of the invention are attained by providing locating members within the magazine chamber of a motion picture apparatus and on the film magazine. Said locating members must be so constructed and arranged that they can be readily adjusted, either in the factory by machining or by the user, and must permit accurate location of the magazine to center the film within the focal plane of the objective.

Reference is hereby made to the accompanying drawing wherein similar reference characters designate similar elements, and wherein.

Figure 1:
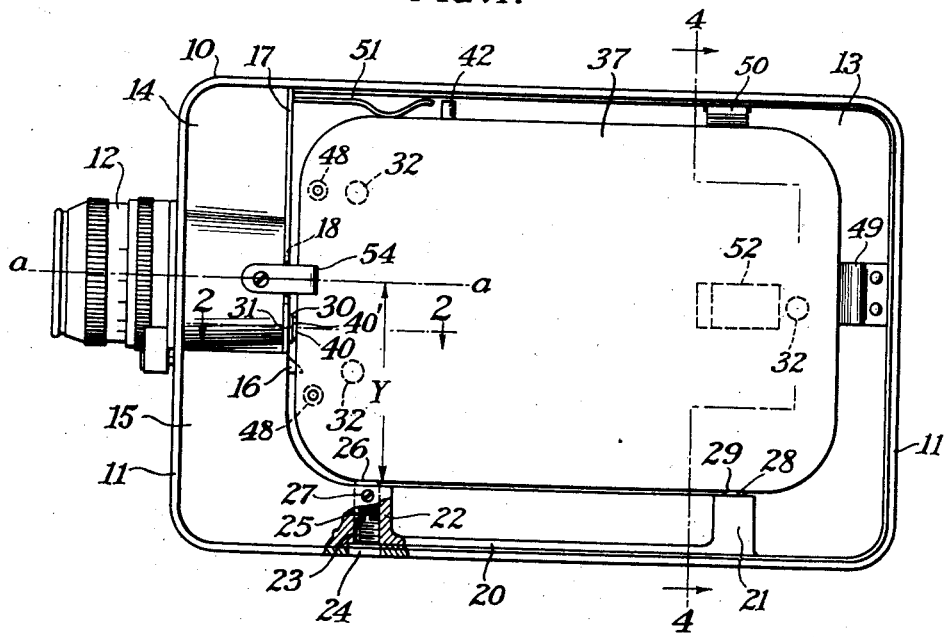
Fig. 1 is a side elevation of a motion picture camera with the cover removed and with a film magazine in position within the magazine chamber of the camera.

Although the invention is to be described with respect to the location of a film magazine within a motion picture camera, it is to be understood that the invention may be applied with equal advantages to other apparatus of the magazine type.

In the illustrated embodiment of the invention, the camera comprises a casing 10 which has lateral edge walls 11. An objective 12, of known construction, is mounted on the front lateral wall 11.

A mechanism plate 13 extends longitudinally of casing 10 and forms one side of the magazine chamber within the camera. The apparatus is provided in a conventional manner with a prime mover, such as a spring motor, a shutter, and a film advancing mechanism, all of which are enclosed by cover plates 14 and 15. Only the claw 16 of the film advancing mechanism is illustrated because of the well-known character of these elements.

Figure 2:
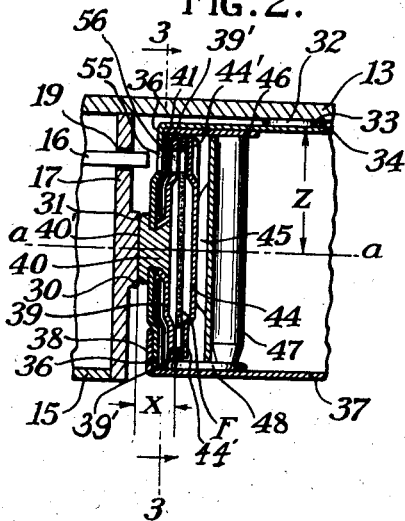
Fig. 2 is a fragmentary cross-section taken on the line 2—2 of Fig. 1.

A front plate 17 is mounted transversely of the casing 10, abuts against the mechanism plate 13, and is provided with an exposure aperture 18. Exposure aperture 18 is centered with respect to the optical axis of objective 12, which axis is indicated by the dot-dash line a—a of Figs. 1 and 2. Front plate 17 is also provided with a slot 19 through which the claw 16 of the film advancing mechanism may extend.

A support member 20 is fastened to the lower lateral wall 11 of casing 10 and includes a leg 21 and a leg 22. The leg 22 is provided with a threaded bore 23 and the lower lateral wall 11 is provided with an opening 24 which is in alinement with bore 22. A locating member 25 is threaded into bore 23 and has a surface 26 in predetermined spaced relation to the optical axis a—a of objective 12, which spacing is designated by the dimension y. Member 25 may be adjusted by inserting a screw-driver through opening 24 to turn the same within bore 23 and vary the horizontal position of surface 26, whereupon member 25 may be fastened in any adjusted position by the set screw 27. The leg 21 has a projection 28 which has a horizontal surface 29 also in predetermined spaced relation to the optical axis a—a of objective 12.

The front plate 17 is provided with a locating member in the form of a projection 30 which may be integral with plate 17 or which may be riveted thereto. Projection 30 has a vertical surface 31 which is in predetermined spaced relation to the focal plane of objective 12, such dimension being designated by the dimension x in Fig. 2. Locating members in the form of projections 32 are provided on mechanism plate 13 and each projection 32 has a vertical surface 33 parallel to the plane of mechanism plate 13 and in spaced relation to the optical axis a—a of objective 12. Such spaced relation of said vertical surfaces 33 is designated by the dimension z, see Fig. 2.

The film magazine comprises a casing which has a side wall 34, and a lateral edge wall 35 which is provided with offset portions 36. A cover 37 encloses the magazine casing and has a rim 38 which engages the outer offset portion 36 of the casing.

Figure 3:
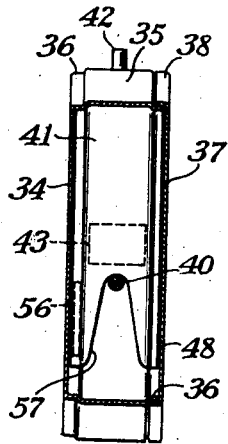
Fig. 3 is a transverse cross-section through the film magazine taken on the line 3—3 of Fig. 2.
Figure 4:
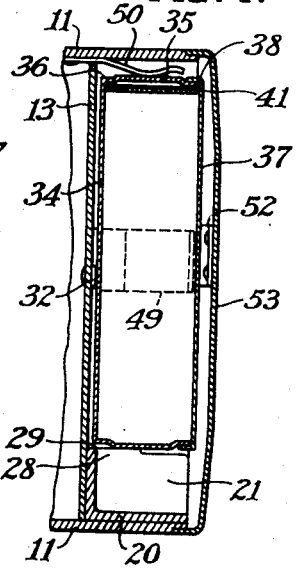
Fig. 4 is a transverse cross-section through the camera and magazine taken on the line 4—4 of Fig. 1.

The gate construction within the film magazine will now be particularly described. The front lateral wall 35 of the magazine casing is provided with an exposure aperture, not shown, but of the same dimension and in registration with the exposure aperture 18 in front plate 17. A gate plate 39 has offset margins 39' and is fastened in spaced relation to the front lateral wall 35 of the magazine casing by a rivet 40, see Fig. 2. A flexible slide 41 is mounted within the space between gate plate 39 and the front lateral wall 35. A pin 42 is attached to flexible slide 41 to facilitate movement thereof within said space. The gate plate 39 is provided with an exposure aperture 43 shown in dotted lines in Fig. 3.

A presser pad 44 also has offset margins 44' and is resiliently pressed toward gate plate 39 by a spring 45. A side plate 46 is mounted on the side wall 34 of the magazine casing, and posts 47 extend from side plate 46 transversely of the magazine. The film F is threaded between gate plate 39 and presser pad 44, being held in accurate position with one surface in contact with the offset margins 39' of said gate plate 39. The spring 45 is interposed between posts 47 and the presser pad 44.

As usual, the emulsion side of the film F faces the front of the magazine and camera. Since the film F is pressed against gate plate 39, the spacing between said gate plate and the forward surface 40' of rivet 40 should be equal to the predetermined spaced distance x. This insures that the emulsion side of the film will be in the focal plane of the objective 12. Since the projection 30 extends from front plate 17, and since rivet 40 extends beyond the lateral wall 35 of the magazine casing, either or both of these locating members can be machined so that the said predetermined spacings or dimensions can be made equal to each other.

Another set of locating members are provided within the film magazine. Disks 48 are riveted to the cover 37 adjacent the front edge thereof. The film is moved through the magazine so that it has a tendency to move to one side of the gate. As a result, one edge of the film rides on the disks 48 so that said disks 48 control the lateral positioning of the film within the magazine to center the film with respect to the exposure apertures in front of the magazine. The location of the magazine within the magazine chamber of the camera such that the film will be centered with respect to the optical axis of the objective is insured by providing the projections 32 so that their surfaces 33 are spaced from the optical axis a—a a distance equal to the dimension from the outer surface of side wall 34 of the magazine casing to a plane through the center of the film at the exposure aperture.

The vertical positioning of the magazine within the chamber is controlled by the locating member 25 and projection 28. The locating member 25 may be adjusted, as previously described, and should be set so that the surface 26 is spaced from the optical axis a—a of the objective 12 a distance equal to the distance between the lower surface of lateral wall 35 and a horizontal plane through the center of the exposure apertures of the magazine. Proper machining or adjustment of the locating member 25, projection 28, projection 30, projections 32 and rivet 40 will provide the several predetermined spacings in the camera and in the film magazine so that the exposure apertures of the magazine will register with the exposure aperture 18 of the camera and be centered with respect to the optical axis a—a of objective 12, and so that the emulsion side of the film F will be located in the focal plane of objective 12.

In order to insure that the appropriate surfaces of the film magazine will snugly abut the accurately provided surfaces of the various locating members, a plurality of resilient members are provided opposite the respective locating members. A spring 49 is attached to mechanism plate 13 at the rear of the magazine chamber and engages the rear lateral wall 35 of the magazine casing. A spring 50 is fastened to the lateral edge wall 11 of the camera casing 10 and is located to engage the upper lateral wall 35 of the magazine casing. A spring 51 is also positioned to engage the upper lateral wall 35 of the magazine casing. Finally, a spring 52 is provided on the cover 53 for the casing 10 of the camera and is positioned as indicated by the dotted lines in Fig. 1 to press on the rear central portion of the magazine cover 37.

Thus, after the film magazine has been inserted into the magazine chamber, and after the cover 53 of the camera has been closed, the spring 49 will urge the film magazine forwardly to bring the forward surface 40' of rivet 40 against projection 30; springs 50 and 51 will urge the film magazine downwardly with the outer surface of the lower lateral wall 35 against the upper and accurately located surfaces of locating member 25 and projection 28, and the spring 52 will make contact with the cover 37 of the magazine casing and urge the film magazine laterally into contact with the accurately machined surfaces of the projections 32.

In addition, another spring 54 is mounted on the front part of the camera and extends into the magazine chamber. This spring bears on the front portion of cover 37 and aids in forcing the film magazine laterally within said chamber and into contact with the accurate surfaces of projections 32.

The arrangement and cooperation of the various locating members and springs or resilient means accomplish an extremely convenient and accurate manner of locating the film magazine within the magazine chamber. Most of these locating members will be machined at the time of manufacturing the camera and magazine—such members will be projection 28, projection 30, projections 32, and rivet 40. The locating member 25 may also be adjusted at the factory, but can readily be adjusted by the dealer or user in the manner previously described. The necessity for accurately locating the film in the gate of the magazine indicates the importance of the present invention.

The front lateral wall 35 in the magazine casing is provided with a slot 55 to permit entrance of the claw 16 into the magazine. In like manner the offset margin 39' of the gate plate 39 is provided with a slot 56. Thus, the film claw 16 is free to pass through slots 55 and 56 to engage the perforations of the film F. The flexible slide 41 which covers the exposure apertures of the magazine also covers the slots 55 and 56, see Fig. 3. Since the rivet 40 is only a short distance below the exposure aperture 43, the flexible slide 41 must be recessed as at 57 to straddle the rivet 40. As a result, the slide 41 may cover both the exposure apertures and the slots for the pulldown claw, but upon retraction, leaves both sets of openings free for exposure and film advancement.

Since many modifications of the present invention other than those disclosed in the present specification are possible, the present invention is to be limited only by the scope of the appended claims.

Having now particularly described our invention, what we desire to secure by Letters Patent of the United States and what we claim is:

1. In a motion picture camera, the combination with a camera body providing a magazine chamber, including internal parts forming walls of said magazine chamber, and provided with a threaded bore adapted to receive the bolt of a tripod head and extending from the exterior of said camera body into said magazine chamber, and an optical objective mounted on said camera body and having an optical axis extending into said magazine chamber, of projections from said internal parts and having surfaces in predetermined spaced relation to the optical axis of said objective, one of said projections being composed of a stud within said threaded bore and adjustable from the exterior of said camera through said threaded bore.

2. In a motion picture film magazine, the combination with a casing having side walls and a lateral wall which is provided with an opening, and a film gate for supporting a film strip across said opening and including a separate apertured plate having a film contacting face, of a separate rigid connection frictionally engaging the lateral wall of said casing, and attached to the plate of said film gate for maintaining said wall and apertured plate in spaced relation, and having an external surface which is in parallel spaced relation to the film contacting face of said plate.

3. In a motion picture film magazine, the combination with a casing having side walls and a lateral wall which is provided with an opening, and a film gate for supporting a film strip across that opening and including a separate apertured plate having a film contacting face, of a separate rigid connection between the lateral wall of said casing and the apertured plate of said gate, for frictionally securing said wall and plate in spaced relation, and having an external surface in parallel spaced relation to the film contacting face of said plate and a closure means movable in the space between said lateral wall and said plate to cover said opening.

4. In a motion picture film magazine, the combination with a casing having side walls and a lateral wall which is provided with an opening, and a film gate for supporting a film strip across said opening and including an apertured plate having a film contacting face, of a rigid connection between the lateral wall of said casing and the apertured plate of said gate, for fixedly securing said wall and plate in spaced relation, and having an external surface in predetermined spaced relation to the film contacting face of said plate, and a shutter slidable within the space between said lateral wall and said plate for covering said opening and provided with a recess which is located to receive said connection upon movement of the shutter adjacent to said connection.

OTTO WITTEL.
LAWRENCE R. MARTIN.